(12) United States Patent
Schneider et al.

(10) Patent No.: US 8,494,745 B2
(45) Date of Patent: Jul. 23, 2013

(54) MOTOR VEHICLE BRAKING SYSTEM HAVING A HYDRAULICALLY ACTUATED SERVICE BRAKING SYSTEM AND AN ELECTROMECHANICALLY ACTUATED BRAKING SYSTEM

(75) Inventors: Heinz-Anton Schneider, Niedernhausen (DE); Jürgen Balz, Hünstetten-Oberlibbach (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 13/378,422

(22) PCT Filed: Jun. 18, 2010

(86) PCT No.: PCT/EP2010/058644
§ 371 (c)(1),
(2), (4) Date: Jun. 13, 2012

(87) PCT Pub. No.: WO2010/146158
PCT Pub. Date: Dec. 23, 2010

(65) Prior Publication Data
US 2012/0245815 A1    Sep. 27, 2012

(30) Foreign Application Priority Data
Jun. 18, 2009 (DE) .................. 10 2009 027 035

(51) Int. Cl.
*B60T 17/08* (2006.01)
(52) U.S. Cl.
USPC .................................. 701/70; 303/89; 303/3
(58) Field of Classification Search
USPC ........................... 701/70; 303/89, 3
See application file for complete search history.

(56) References Cited

U.S. PATENT DOCUMENTS 6,019,436 A * 2/2000 Siepker ........................ 303/13
6,447,074 B2 * 9/2002 Engelhard ................... 303/3

(Continued)

FOREIGN PATENT DOCUMENTS

| DE | 10150803 A1 | 5/2003 |
|---|---|---|
| DE | 10345485 A1 | 4/2005 |

(Continued)

OTHER PUBLICATIONS

German Application Serial No. 10201030276.7, German Search Report dated Oct. 29, 2010, 4 pgs.

(Continued)

*Primary Examiner* — Mary Cheung
*Assistant Examiner* — Michael Berns
(74) *Attorney, Agent, or Firm* — RatnerPrestia

(57) ABSTRACT

The invention relates to a motor vehicle brake system having a hydraulically actuatable service brake system and an electromechanically actuatable brake system, including an operating element HMI, in particular for activating a parking brake function, an electronic control device (EPB-ECU) for activating an electromechanical actuator of the electromechanically actuatable brake system, and an electrohydraulic control unit (HECU) associated with a service brake and serving to control or regulate hydraulically implemented service brake functions, driving stability functions and/or braking assistance functions. It is an aim of the invention to contribute to reducing the stress on parts or components of the brake system. It is proposed that an electronically controlled hydraulic pressure conditioning process is carried out in integrated brake calipers after hydraulic actuation of the brake, it being further provided that the electromechanical brake system generates additional application forces only after the hydraulic pressure conditioning process.

15 Claims, 5 Drawing Sheets

U.S. PATENT DOCUMENTS

| | | | |
|---|---|---|---|
| 6,545,852 B1 * | 4/2003 | Arnold | 361/160 |
| 6,701,242 B1 * | 3/2004 | Diebold | 701/70 |
| 7,434,669 B2 * | 10/2008 | Halasy-Wimmer et al. | 188/171 |
| 7,464,996 B2 * | 12/2008 | Saewe et al. | 303/89 |
| 7,744,166 B2 * | 6/2010 | Leiter et al. | 303/20 |
| 7,780,244 B2 * | 8/2010 | Inagaki et al. | 303/89 |
| 2006/0186731 A1 * | 8/2006 | Bach | 303/89 |
| 2006/0186732 A1 * | 8/2006 | Saewe et al. | 303/89 |
| 2012/0299367 A1 * | 11/2012 | Ross et al. | 303/3 |

FOREIGN PATENT DOCUMENTS

| | | |
|---|---|---|
| DE | 10349970 A1 | 6/2005 |
| DE | 10349970 B4 | 3/2006 |
| DE | 10150803 B4 | 8/2006 |
| EP | 0825081 A1 | 2/1998 |
| EP | 0825081 B1 | 3/2002 |
| WO | WO-2005073043 A1 | 8/2005 |

OTHER PUBLICATIONS

German Application Serial No. 10201030276.7, International Search Report dated Dec. 8, 2010, 3 pgs.

* cited by examiner

MOTOR VEHICLE BRAKING SYSTEM HAVING A HYDRAULICALLY ACTUATED SERVICE BRAKING SYSTEM AND AN ELECTROMECHANICALLY ACTUATED BRAKING SYSTEM

CROSS REFERENCE TO RELATED APPLICATIONS

This application is the U.S. National Phase Application of PCT International Application No PCT/EP2010/058644, filed Jun. 18, 2010, which claims priority to German Patent Application No. 10 2009 027 035.3, filed Jun. 18, 2009, the contents of such application being incorporated by reference herein.

FIELD OF THE INVENTION

The present invention relates to a motor vehicle brake system having the features of the preamble of claim 1. The combination of features, as a brake system having an electromechanically implemented parking brake function, is known in principle.

The invention further relates to an associated operating method for the motor vehicle brake system.

BACKGROUND OF THE INVENTION

Known from EP 0 825 081 B1 which is incorporated herein is a motor vehicle having a driving stability function (ESP) and a hydraulic pressure generator in the form of a pump having an electromechanical adjusting unit for an actuator, a transfer between actuating devices and actuating modes being defined on the basis of a minimum application force. This necessarily implies that the electromechanical adjusting unit can generate at least the magnitude of the application force introduced hydraulically by the pump, so that the above-mentioned transfer condition can be fulfilled.

A hydraulic vehicle brake with an electrically actuatable parking brake device is further known from DE 101 50 803 B4 which is incorporated herein. It is proposed in that document that, in order to optimize the stress on the components of the vehicle brake, an application force which is reduced in comparison to a maximum application force is made available by the electric motor when sensor information indicates an actuation of a service brake pedal. In other words, the proportion of application force to be generated by the electric motor is reduced by an amount which has been introduced hydraulically by the vehicle driver. This procedure makes possible a reduction of stress on the electric motor during an application phase by reducing the electrical current demand. This results in a power flow of the reaction forces which is split in a state-dependent manner. This is because, during the actuation phase of application—while the hydraulic assistance is being utilized—a reduced reaction force is present in the electromechanical drivetrain. After the hydraulic pressure has been reduced (driver ends pedal actuation), the hydraulic reaction force component is abruptly superimposed additionally on the power flow of the drivetrain of the parking brake system.

Known systems, devices and methods, in combination with so-called integrated brake calipers, suffer from the disadvantage that an electromechanical drive and transmission system of the actuator and, above all, the brake caliper housing and the brake caliper bridge, must in principle be designed to be overdimensioned mechanically, that is, to have considerably higher power capacity than is strictly necessary, in order to be able to reliably withstand alternating stresses in the transfer process.

SUMMARY OF THE INVENTION

By contrast, an aspect of the invention makes available a motor vehicle brake system and an operating method which eliminate the disadvantages of the prior art and make it possible to design all the components of a motor vehicle to be durable without excessive dimensioning while retaining the same fundamental reliability, and thereby to contribute to reducing component weight and manufacturing costs.

The features of the solution according to an aspect of the invention are based in principle on a hydraulic pressure conditioning process in the form of an electrically controlled or regulated hydraulic pressure reduction, or at least a pressure limitation, before the electromechanical actuator delivers application force or is brought electrically into operation at all. In this case the pressure reduction or pressure limitation is preferably effected in a state-dependent manner, that is, in dependence on certain, in particular safety-relevant, marginal conditions such as, in particular, standstill of the vehicle. Extension to include further criteria is possible. A threshold or limit for an electrical current demand of the actuator is not varied, but remains constant.

In a further configuration of an aspect of the invention, it is proposed to reduce the hydraulic pressure introduced into the integrated brake calipers to a certain predefined value if standstill of the vehicle is detected, provided the hydraulic pressure build-up results from a brake actuation during driving of the motor vehicle; or the hydraulic pressure is simply limited to a certain, defined value if, for example, it has been detected that the hydraulic pressure has been introduced in order to bring the vehicle to a standstill, and to hold the vehicle at standstill by transfer to the electromechanical brake system.

It is self-evident that means and measures are provided for plausibility checking a pressure conditioning process, in the context of which it is determined in advance, for example, whether a routine pressure conditioning process can or cannot be carried out without damage to persons and vehicle. This is made possible, in particular, by evaluating and balancing electrical transmitter, switch or sensor information (pressure sensor, inclination angle sensor, wheel rotational speed or deceleration sensors, throttle and brake actuation sensors, vehicle sensors, image capturing devices (in particular sensors for clutch travel, gradient, yaw angle, acceleration, distance, radar, lidar, ultrasound, wheel rotation, and the like)). In this case it is checked in advance with the aid of a higher-level balancing of multiple transmitter information (optionally by the chassis controller) whether a routine pressure conditioning process would lead to a roll-away process of the vehicle which is evaluated as undesirable. Alternatively, it may be provided that the pressure conditioning process has a variable threshold, and that the pressure conditioning process is carried out up to a point which is indicated by a state change detected or determined by means of sensors.

A fundamental service brake function of an integrated brake caliper is in no way impaired by the measure described. Rather, use is made of the consideration that, with the vehicle at standstill on an incline (rising or falling gradient) which is measured or assumed as given, significantly lower hydraulic pressures in the brake system or in the integrated brake calipers are sufficient, depending on demand, to achieve a defined holding of a vehicle than can be generated by a vehicle driver by completely spontaneous actuation of a brake pedal/actuation of the service brake function, so that such spontaneous, excessive brake actuation is implemented in an electronically regulated, that is, modified manner, and is conditioned in such a way that the system components are protected from unnecessary overloading while retaining complete system availability with full functionality.

An aspect of the invention makes it possible to increase the durability of the components of the electromechanically actuatable brake system by predictively preventing certain cases of actuation of a load spectrum which have increased damage potential. This can be effected by intelligent activation of components of an HECU in combination with pressure limiting or pressure reduction. The invention therefore serves and makes possible, in particular, a greatly improved, networked activation system between an electromechanically actuatable parking brake system and an ESP service brake system which is present in any case, by adjusting to one another and regulating the common resources, energy sources and actuators and activating them only to an extent which is strictly necessary in order to achieve the desired application force result.

The above-mentioned pressure limiting or pressure reduction is therefore implemented through cooperation of components of the parking brake system and of the service brake system in terms of mutually adjusted regulation. In this case the necessity of conditioning in the form of pressure influencing or pressure limiting at vehicle standstill can be estimated with the aid of pressure sensor information present in any case and comparison thereof with a predefinable pressure threshold value (admission pressure maximum value), for example of 40 bar. In the case of a positive result pressure can be limited, in particular, by closing inlet valves (EV) between electrohydraulic energy source (ESP hydraulic unit/motor-pump unit, externally actuatable brake force booster or master cylinder) and the respective integrated brake calipers, provided the above-described marginal conditions are present (standstill, exceeding of the pressure threshold). A pressure reduction can be implemented in that an excessive hydraulic pressure in the integrated brake calipers is brought about by closing the inlet valves (EV) between ESC unit and integrated brake calipers, and/or by opening outlet valves (AV) between integrated brake calipers and ESC unit, the excess pressure being reduced by volume displacement into a low-pressure accumulator (NDS) of the ESC.

In the case of a diagonal brake circuit division (X split), it is possible in principle, in addition to the procedure described, to insert at least one isolating valve (TV) per brake circuit between a hydraulic pressure generator (master cylinder) and the HECU, or to utilize an existing isolating valve, the hydraulic pump of the HECU being started and a fluid volume present in the low-pressure accumulators (NDS) being pumped into brake calipers without a parking brake function in order to build up pressure.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 4:
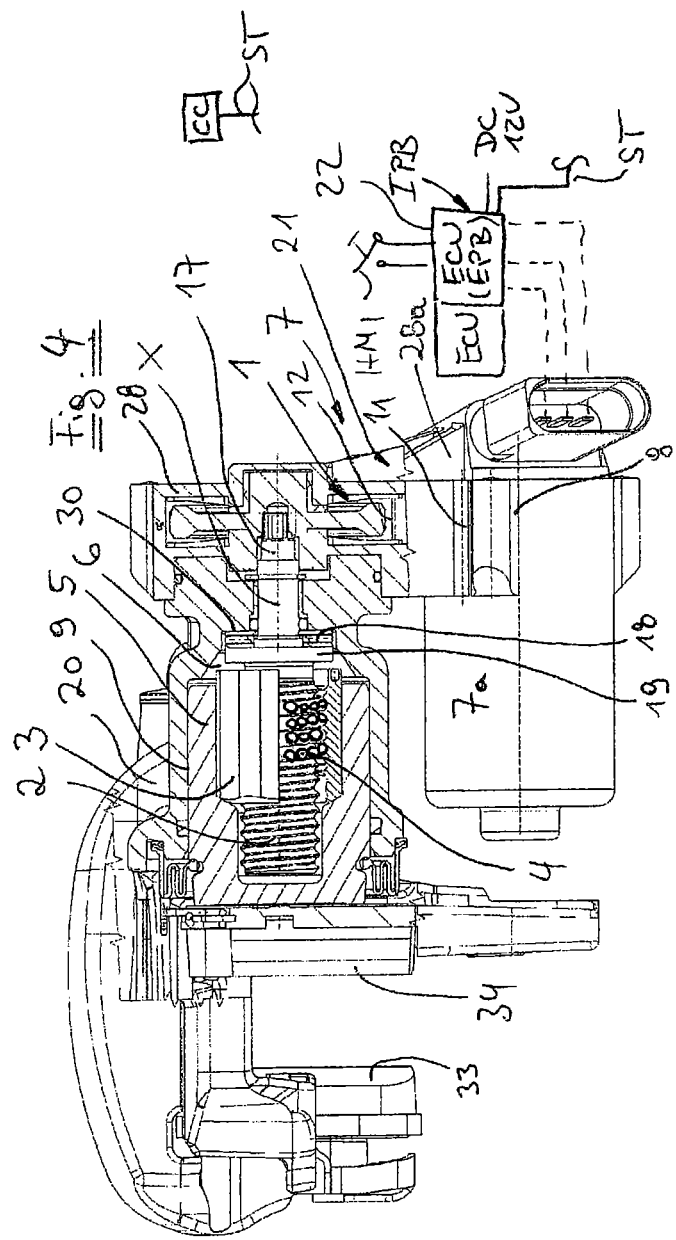
FIG. 4: shows an integrated brake caliper having combined electromechanical and hydraulic actuation in cross section.

A vehicle brake comprises, on the one hand, a hydraulically actuatable service brake function and, on the other, an electromechanically actuatable brake function which is designed primarily as a parking brake function. As shown in FIG. 4, the vehicle brake is in the form of a floating-caliper disk brake. An electromechanical actuator 7 including an electric motor 7a serves to execute an electromechanical braking function. The actuator 7 includes a multi-stage, in particular two-stage, transmission 1, sensors S1-Sx and an electronic control unit 22 (ECU (EPB)). The above-mentioned vehicle brake further comprises a brake housing or brake caliper 20, 20' which extends around the outer edge of a brake disk (not shown), and two brake pads 33, 34 arranged on each side of the brake disk. The brake caliper 20 has on its inner side a brake cylinder 9 which receives an axially displaceable brake piston 5. In order to perform service brake operations, brake fluid can be supplied to the operating pressure chamber 6 formed between brake cylinder 9 and brake piston 5, so that a brake pressure which displaces the brake piston 5 axially along an axis X towards the brake disk is built up. The brake pad 34 oriented towards the brake piston 5 is thereby pressed against the brake disk. As a reaction, the brake caliper 20 can be displaced in the opposite direction, so that the other brake pad 33 is also pressed against the brake disk.

In the course of an automatic or driver-initiated electromechanical brake actuation, the electric motor 7a is energized and the rotary drive motion is converted by means of the transmission 1 into a translational motion of the piston 5 along the axis X. In order to perform the conversion, the transmission 1 may include, in addition to the aforementioned two transmission stages, a spindle 2 and a threaded nut 3 which are connected to one another via rolling elements 4. The rolling elements 4 are in the form of balls. A shaft 17 connected to the spindle 2 projects from the brake caliper 20 on the side oriented away from the brake disk and is driven via the interposed transmission 1. In this case means are provided for sealing the operating pressure chamber 6 in the bore of the brake caliper 20, through which the shaft 17 projects. The rotary motion transmitted to the spindle 2 is transmitted to the threaded nut 3 via the rolling elements 4 located in the thread convolution between spindle 2 and threaded nut 3, which threaded nut 3 executes a translational movement in the direction of the axis X. The brake piston 5 against which the threaded nut 3 bears is actuated thereby. At the same time, the spindle 2 is received by a stepped bore 30 in the brake caliper 20 and bears against the brake caliper 20 via a collar 19 connected to the spindle 2 and an axial bearing 18. The transmission 1 therefore converts the rotary motion of the electromechanical actuator 7 into linear motion, and is responsible for generating the application force for executing an electromechanically implemented (parking) brake process.

In order to release the electromechanical brake device, the actuator 7 is operated in reverse and the threaded nut 3, and therefore also the brake piston 5, perform a movement to the right in FIG. 4. The brake pads 33, 34 are thereby no longer in contact with the brake disk and the release state of the parking brake device is established.

Figure 1:
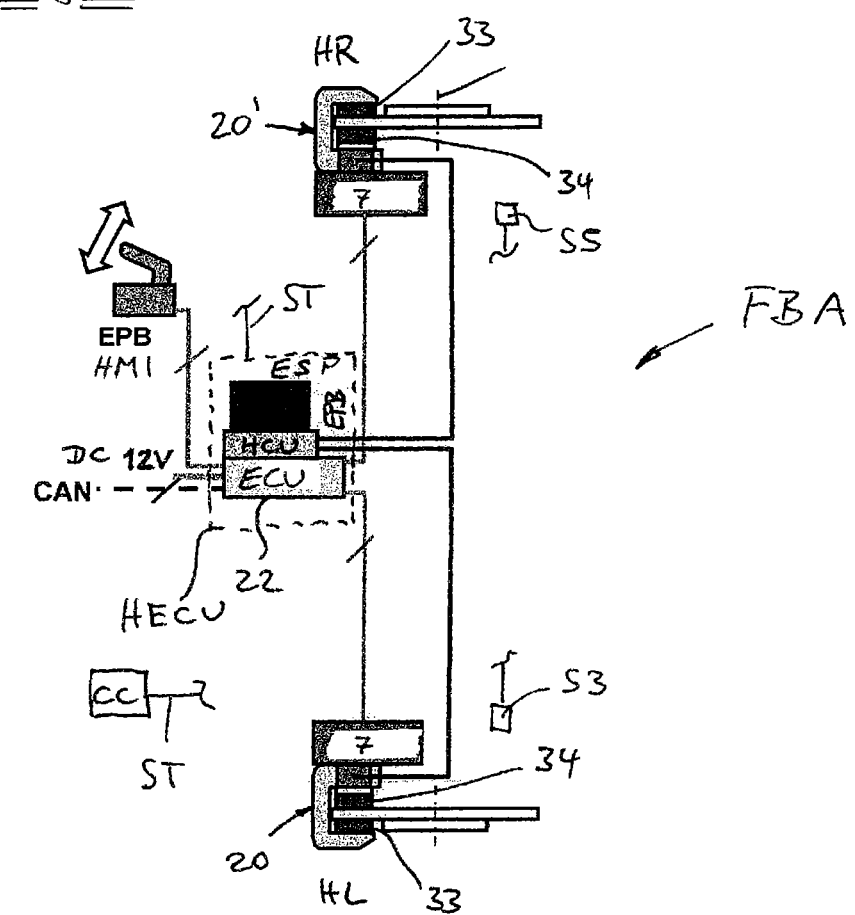
FIG. 1: is a schematic diagram showing the structure of an electromechanical brake system as a component of a partially illustrated vehicle brake system FBA containing a common electronic control unit (IPB)
Figure 2:
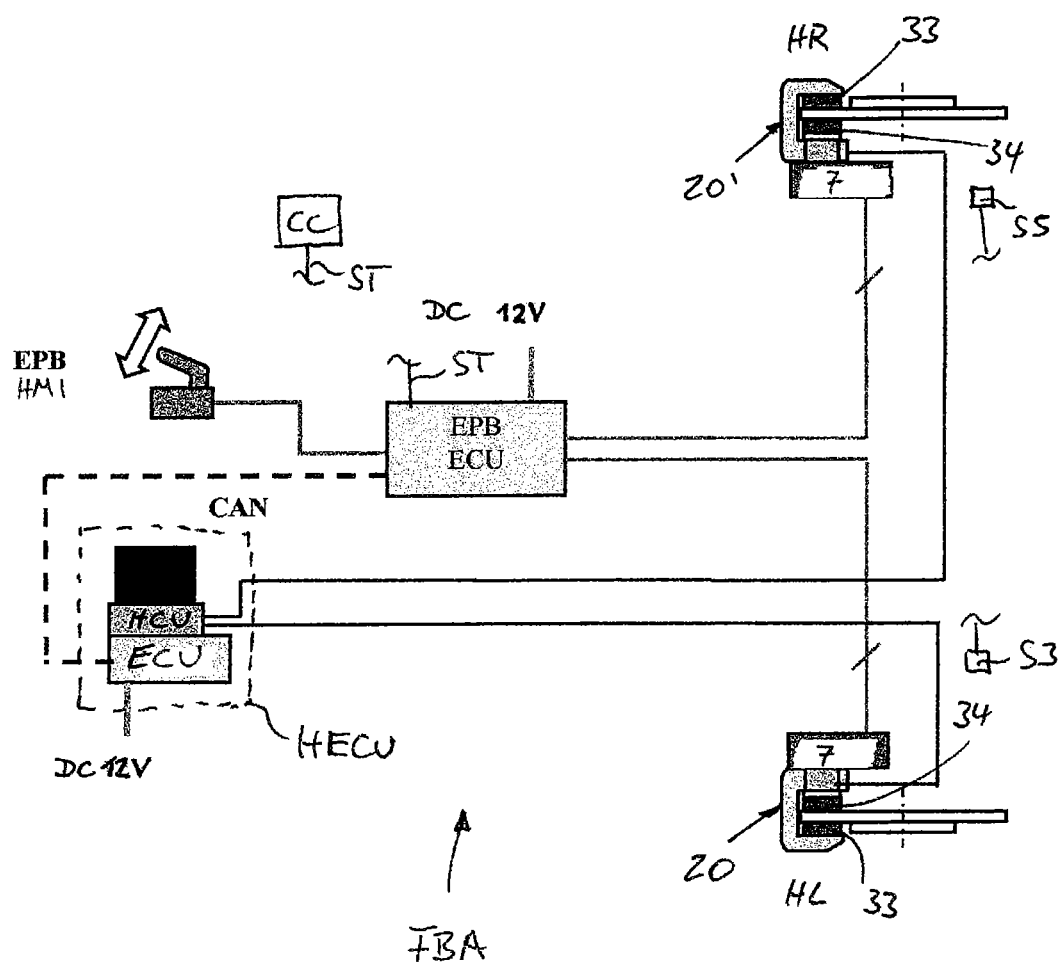
FIG. 2: is a schematic diagram showing the structure of an electromechanically actuatable brake system as a component of a partially illustrated vehicle brake system FBA with a separate (stand-alone) control unit (EPB-ECU)
Figure 3:
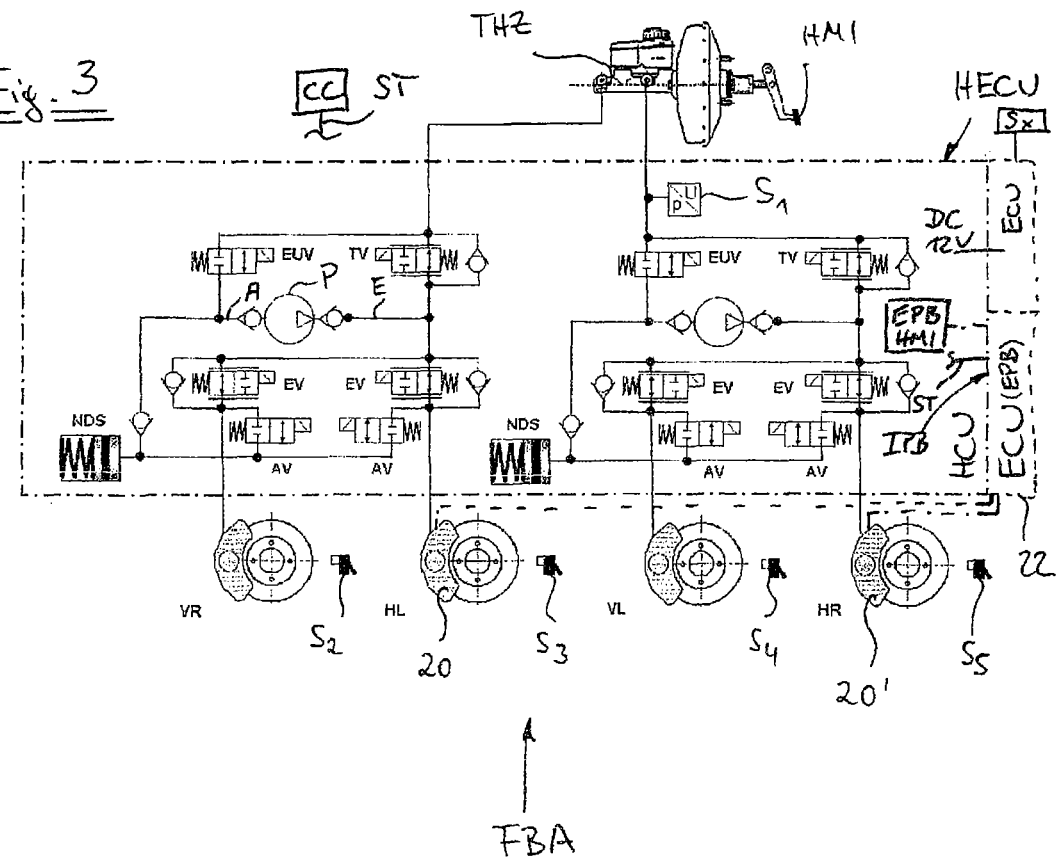
FIG. 3: is a circuit diagram of an externally actuatable hydraulic vehicle brake system including an ESP function with integrated brake calipers having combined actuation, in the region of a rear axle.

FIGS. 1-3 illustrate configurations of a multi-circuit, electronically controlled, externally activatable motor vehicle brake system FBA with ESP function, the service brake system having in principle a diagonal brake circuit division, and the electromechanical brake actuation relating to a brake circuit formed by the brake calipers 20, 20' of the wheel brakes HR, HL of a rear axle. A hydraulic unit HCU comprises a motor-pump unit with a pump P including a pressure medium inlet E and a pressure medium outlet A, a damping device which contains a plurality of damping means connected in cascade and involving at least one damping chamber usually being provided directly after the pressure medium outlet A. The pressure medium outlet A, as schematically illustrated, is connectable in a valve-controlled manner to a master cylinder (THZ) or to wheel brakes VR, HL, VL, HR, depending on the function required. Electromagnetic inlet valves EV, outlet valves AV, reversing valves EUV and isolating valves TV are provided in the HCU in order to regulate pressure or to switch to the suction path and pressure path of the pump P. In principle, the pump P, the damping means and the valves EV, AV, EUV, TV are arranged together with the pump P in a common receiving body of the HCU thus formed. An electronic control unit ECU is provided for the electronic activation and supply of valves V and pump P, and at the same time for electrically activating the integrated brake calipers HL, HR; for this purpose it is directly connected electrically to the brake calipers 20, 20' by means of 2-wire or multi-wire conductors. Altogether, an integrated control unit (IPB) arranged in a single housing is thereby configured for service and parking brake functions.

Figure 5:
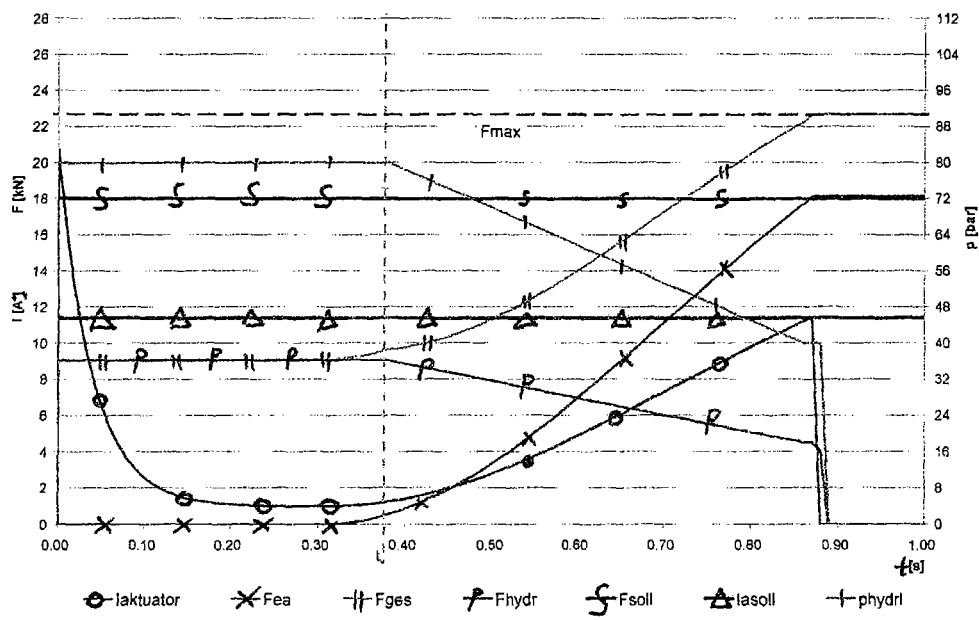
FIG. 5: is a graph illustrating in exemplary fashion the curves of a plurality of physical values in an electronically controlled pressure conditioning process, plotted in each case over time t.

Following the above explanation of the essential components of a vehicle brake system comprising hydraulic service brake components and electromechanical brake components as well as integrated brake calipers 20, 20', a functional description of an operating method using an electronically controlled or regulated hydraulic conditioning process is set forth below with reference to FIG. 5.

To begin with, an imminent hydraulic or electromechanical brake actuation can be determined in advance by a plausibility check with reference to a plurality of different pieces of information, such as in particular with reference to a balancing of sensor information in order to evaluate an actual or imminent vehicle state. It is thereby made possible to determine an imminent braking actuation in advance. This may be carried out, for example, in the context of an image-supported, automated vehicle control system for accident avoidance, or by other electronic driver assistance systems (for example ADAS, global chassis control or the like). To summarize, on the basis of the available information it is decided whether or not an electronically controlled hydraulic pressure conditioning process is necessary in principle.

It is self-evident in this context also that separate means or measures for plausibility checking a decision continue to be provided, in the course of which it is determined in advance whether a planned pressure conditioning process can or cannot be carried out at all without damage to persons or vehicle. This is possible, in particular, through evaluation and balancing of sensor information (inclination angle sensor, wheel rotation sensor, (rotational) acceleration sensor or the like), in that it is checked in advance with the aid of the sensor information whether a routine pressure conditioning process would lead to undesired, uncomfortable or dangerous vehicle behavior (for example, rolling back on a slope). Alternatively, it may be provided that the electronically controlled pressure conditioning process has a variable threshold such that the pressure conditioning process is carried out up to a point, which threshold is indicated by a sensor-detected state change (for example, the sensor-detected start of the rolling-back process on the slope, or a given rolling-back velocity).

Following the detection and verification, it may be provided, in dependence on the desired result and vehicle behavior, that the electronically controlled hydraulic pressure conditioning process is undertaken only temporally after the actuator 7 has been energized, or, to some degree, in a predictive manner. What is essential is that the pressure conditioning process is started before the actuator 7 contributes an application force component Fea to a significant degree. For example, a time tv for initiating the pressure conditioning process occurs in a time window of up to approximately 0.4 s after starting the actuation of the electromechanical actuator 7 (time t=0).

The electronically controlled hydraulic pressure conditioning process may be carried out in the form of an electronically controlled hydraulic pressure reduction or in the form of an electronically controlled hydraulic pressure limitation. In either case, the hydraulic pressure conditioning (pressure reduction or pressure limiting) is carried out in a state-dependent manner in dependence on sensed or measured concrete vehicle driving states or vehicle operating states, or operating states such as, in particular, brake actuation states. The electronically controlled hydraulic pressure conditioning process may be carried out, in particular, if standstill of the vehicle is to be established or secured after driver-initiated braking, in the form of a vehicle holding process. In this case a threshold for a maximum power demand $I_{Aktuator}$ of the actuator 7 is predefined in a fixed manner and, in particular, is not modified or varied.

In a further configuration of the invention, it is also proposed to reduce the hydraulic pressure $p_{hydr}$ in the integrated (combined) brake calipers 20, 20' at standstill of the vehicle to a particular level, if the hydraulic pressure build-up results from automated braking, for example, up to standstill of the motor vehicle. Alternatively, if the balancing of the determined or measured signal and information patterns allows a later actuation of the parking brake device to be detected reliably and to some degree predictively, a simple limiting or regulating of the induced hydraulic pressure to a given level may already be undertaken during actuation of the brake. In other words, a certain fading effect may be provided. This is apparent from FIG. 5, in that a linear reduction, not a sudden drop, of the hydraulic pressure $p_{hydr}$ from time tv is provided.

The aforementioned pressure limiting or pressure reduction may be carried out to an extent in a co-coordinated manner through cooperation between the preferably integrated EPB system and ESP system and, if required, through interaction with other motor vehicle assistance systems. These systems include, in particular: comfort assistance functions, such as vehicle distance control systems, drivetrain and transmission control systems, regenerative or recuperative braking systems, accident avoidance systems or other motor vehicle control systems. By means of networking it is possible to implement higher-level, mutually adjusted electronic system control in order to reduce load spikes in the region of the parking brake device. In principle, it is possible to provide for the necessity to modify, influence or limit pressure with the aid of a pressure sensor S1 by comparison with a predefinable pressure threshold value (admission pressure maximum value)—for example, 40 bar—when standstill of the vehicle is determined.

In a further configuration of the invention, an application and use of the signals of pressure sensors which measure the hydraulic pressure in the pressure chambers 6 of the integrated brake calipers 20, 20' is possible.

Pressure limiting may be carried out, in particular, in that inlet valves EV between electrohydraulic energy source (ESP hydraulic unit/motor-pump unit, externally actuatable brake force booster or master cylinder) and the respective integrated brake calipers are closed if the above-described marginal conditions are present.

Pressure reduction may be implemented in that an excessive hydraulic pressure in the integrated brake calipers is brought about by closing the inlet valves EV of the HECU and/or opening outlet valves AV of the HECU, the hydraulic pressure being reduced by volume displacement into a low-pressure accumulator NDS of the HECU.

In the case of a diagonal brake circuit division (X split), in addition to the procedure described at least one isolating valve TV per brake circuit is closed between a hydraulic pressure generator (master cylinder THZ) and the ESP unit, the hydraulic pump of the ESP unit being started and a fluid volume contained in the low-pressure accumulators NDS being pumped into the non-integrated brake calipers (in a preferred configuration, the brake calipers arranged on a front axle VA), where it can be utilized to increase pressure.

Although the invention has been explained primarily with regard to a manually requested, electromechanically executed parking brake actuation, multiple embodiments and applications, which may be combined with partially or fully automated driver assistance functions, are possible. It is self-evident that a corresponding networking of the control unit ECU with other sensors S1-Sx and/or with other electronic control devices of a motor vehicle is provided for this purpose, within a networked, wire-connected or wireless data transfer system that employs, by way of example, any one of the following automotive network communications protocols: Controller Area Network (CAN); Local Interconnect Network (LIN); FLEXRAY™, or BYTEFLIGHT™. The specifications of these automotive network communications protocols are well known to those of ordinary skill in the art, and are incorporated by reference herein. It is further self-evident that the electronic control unit ECU has at least one open interface ST which is set up in such a way that a pressure conditioning process requested externally, that is by a vehicle-integrated control device, or requested by a control device arranged outside the vehicle (external request), is executed. This interface ST may be provided in wire-connected or wireless form, just as in otherwise networking the most diverse electronic control devices.

The invention is especially suited to being combined with a higher-level electronic chassis controller CC which executes higher-level coordination, control and regulation of higher-level functions in an automated, networked electronic motor vehicle control system, so that, for example, mutually contradictory control interventions by different electronic control units of a motor vehicle can be reconciled by means of this higher-level electronic networking and interaction. In such a configuration of a motor vehicle it is possible, in particular, that a form of master function which influences the control and regulation of the parking brake function is allocated in the activation system to the chassis controller. The opposite case, in which the chassis controller issues, so to speak, an order to execute a pressure conditioning process to an electronic control device is also possible, in which case the order can be rejected by the electronic control device concerned (ECU, IPB, EPB-ECU), for example for safety reasons.

LIST OF REFERENCES

1 Transmission
2 Spindle
3 Threaded nut
4 Rolling element
5 Brake piston
6 Hydraulic operating pressure chamber
7 Electromechanical actuator
7a Electric motor
8 Motor shaft
9 Brake cylinder
11 Transmission stage
12 Transmission stage
17 Shaft
18 Axial bearing
19 Collar
20 Brake caliper
21 Drive module
22 Control unit
28 Housing
28a Housing cover
30 Stepped bore
33 Brake pad
34 Brake pad
A Outlet
CC Electronic chassis controller
E Inlet
ECU Electronic control unit
EV,AV,TV,EUV Valve
ESP Driving stability function
FBA Motor vehicle brake system
HMI Human-machine interface
HCU Hydraulic unit
IPB Common control unit
NDS Low-pressure accumulator
P Pump
S1,2,3 . . . x Sensor (pressure, wheel, etc.)
ST Interface
THZ Tandem master cylinder
VR Wheel brake, front right
VL Wheel brake, front left
HR Wheel brake, rear right
HL Wheel brake, rear left
X Axis
$I_{Aktuator}$ Measured/determined actuator current
$I_{asoll}$ Predetermined actuator current (preset current)
$F_{ea}$ Application force component, electromechanical
$F_{soll}$ Reference application force (legal requirement)
$F_{hydr}$ Application force component, hydraulic
$F_{ges}$ (Aggregated) application force
$p_{hydr}$ Hydraulic pressure
$t_v$ Closing time EV

The invention claimed is:

1. A motor vehicle brake system having a hydraulically actuatable service brake system and an electromechanically actuatable brake system, comprising:
   an electromechanically actuatable brake caliper, the brake caliper defining at least one operating pressure chamber;
   an operating element for activating a parking brake function;
   an actuator coupled to the brake caliper;

an electronic control unit for activating the actuator; and
an electrohydraulic control unit which is hydraulically connected with a service brake and serves to control or regulate service brake functions, driving stability functions and/or braking assistance functions,
wherein in order to reduce stress on parts or components of the electromechanical brake system following an automatic or driver-initiated hydraulic brake actuation, and prior to completion of a temporally following electromechanical brake actuation, an electronically controlled hydraulic pressure conditioning process is carried out by the electrohydraulic control unit in the at least one operating pressure chamber of the electromechanically actuatable brake caliper, the pressure conditioning process comprising at least one of an electronically controlled hydraulic pressure reduction or an electronically controlled hydraulic pressure limitation.

2. The motor vehicle brake system as claimed in claim 1, wherein a brake actuation is predetermined by plausibility checking with reference to a plurality of different pieces of information, with reference to a balancing of a plurality of pieces of sensor information, in order to evaluate an actual vehicle driving state, and the electronically controlled hydraulic pressure conditioning process takes place temporally after energization of the actuator.

3. The motor vehicle brake system as claimed in claim 1, wherein the actuator generates a perceptible application force component temporally after the electronically controlled hydraulic pressure conditioning process.

4. The motor vehicle brake system as claimed in claim 1, wherein the actuator is actuated, and generates a reduced application force component, during the electronically controlled hydraulic pressure conditioning process.

5. The motor vehicle brake system as claimed in claim 1, wherein the electronically controlled hydraulic pressure conditioning process comprises a hydraulic pressure limiting function or a hydraulic pressure reducing function.

6. The motor vehicle brake system as claimed in claim 5, wherein the electronically controlled hydraulic pressure conditioning process comprises at least one actuation of an electromagnetic valve of an electrohydraulic control unit, which actuation is controlled or regulated by the electronic control unit of the service brake system.

7. The motor vehicle brake system as claimed in claim 1, wherein the electronically controlled hydraulic pressure conditioning process has predetermined parameters, including hydraulic pressure threshold values predetermined to be constant, which are stored in the electronic control unit.

8. The motor vehicle brake system as claimed in claim 1, wherein the electronically controlled hydraulic pressure conditioning process has state-dependently adapted hydraulic pressure threshold values.

9. The motor vehicle brake system as claimed in claim 1, wherein the electronically controlled hydraulic pressure conditioning process is carried out in a state-dependent manner, in dependence on brake-relevant marginal conditions, measurement values and/or parameters, in dependence on a detected standstill of the vehicle.

10. The motor vehicle brake system as claimed in claim 1, wherein a plausibility check is carried out prior to execution or ending of the electronically controlled hydraulic pressure conditioning process in order to determine in advance, on the basis of measured or determined information, whether the pressure conditioning process can or cannot be carried out without danger, and in that a decision to carry out a pressure conditioning process is rejected, interrupted or ended after a negative result of the plausibility check.

11. The motor vehicle brake system as claimed in claim 1, wherein the electronic control unit of the electromechanically actuatable brake system and the electronic control unit of the service brake system are provided to be integrated in a common housing as a common control unit.

12. The motor vehicle brake system as claimed in claim 11, wherein the common control unit comprises a network with other sensors and/or electronic control devices (ECU) of a motor vehicle within a networked, wire-connected or wireless data transfer system.

13. The motor vehicle as claimed in claim 12, wherein the wireless data transfer system incorporates an automotive network communications protocol selected from the group consisting of CAN, LIN, FLEXRAY and Byteflight.

14. The motor vehicle as claimed in claim 11, wherein the common electronic control unit has at least one open interface which is set up in such a way that that a pressure conditioning process is executed upon request by another vehicle-integrated electronic control device, or upon request by an electronic control device arranged outside the vehicle, such as in particular upon request by a higher-level electronic chassis controller.

15. An operating method for a motor vehicle brake system having a hydraulically actuatable service brake system and an electromechanically actuatable brake system, comprising an operating element for activating a parking brake function, an electronic control unit for activating an actuator of the brake system, and an electrohydraulic control unit which is associated with a service brake and serves to control or regulate service brake functions, driving stability functions and/or braking assistance functions, wherein in order to reduce stress on parts or components of the electromechanical brake system following an automatic or driver-initiated hydraulic brake actuation, and prior to completion of a temporally following electromechanical brake actuation, an electronically controlled hydraulic pressure conditioning process is carried out in at least one operating pressure chamber of an electromechanically actuatable brake caliper, the method comprising brake actuation predetermined by checking with reference to a plurality of different pieces of information, with reference to a balancing of a plurality of pieces of sensor information, in order to evaluate an actual vehicle driving state, and the electronically controlled hydraulic pressure conditioning process takes place temporally after energization of the actuator.

* * * * *